United States Patent
Wrobel et al.

(10) Patent No.: US 12,041,184 B2
(45) Date of Patent: Jul. 16, 2024

(54) DEVICE AND METHOD FOR ISSUING A LIMITED-USE ELECTRONIC CERTIFICATE

(71) Applicant: MOTOROLA SOLUTIONS, INC., Chicago, IL (US)

(72) Inventors: Pawel Wrobel, Gorenice (PL); Andrzej Grzesik, Jaworzno (PL); Pawel Fafara, Cracow (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 220 days.

(21) Appl. No.: 17/654,645

(22) Filed: Mar. 14, 2022

(65) Prior Publication Data

US 2023/0291576 A1   Sep. 14, 2023

(51) Int. Cl.
*H04L 9/32* (2006.01)
*H04L 9/00* (2022.01)

(52) U.S. Cl.
CPC ............ *H04L 9/3268* (2013.01); *H04L 9/006* (2013.01)

(58) Field of Classification Search
CPC ..... H04L 9/3268; H04L 9/006; H04L 9/0891; H04L 9/321; H04L 63/0823; H04L 63/20; G06F 21/33
See application file for complete search history.

(56) References Cited

U.S. PATENT DOCUMENTS

| | | | |
|---|---|---|---|
| 10,454,689 B1 * | 10/2019 | Sharifi Mehr | H04L 63/166 |
| 10,547,457 B1 * | 1/2020 | Duccini | H04L 9/50 |
| 11,838,762 B1 * | 12/2023 | Shahidzadeh | H04W 12/69 |
| 2007/0277248 A1 * | 11/2007 | Agrawal | G06F 8/60 726/30 |
| 2010/0031041 A1 * | 2/2010 | Cohen | H04L 9/3263 713/168 |
| 2010/0138907 A1 | 6/2010 | Grajek et al. | |

(Continued)

FOREIGN PATENT DOCUMENTS

| | | |
|---|---|---|
| EP | 3024167 A1 | 5/2016 |
| EP | 3588917 A1 | 1/2020 |
| WO | 2012092096 A1 | 7/2012 |

OTHER PUBLICATIONS

The International Search Report and the Written Opinion, corresponding patent application No. PCT/US2023/012911 filed: Feb. 13, 2023, mailed: Apr. 13, 2023, all pages.

*Primary Examiner* — Michael Simitoski
*Assistant Examiner* — Hany S. Gadalla
(74) *Attorney, Agent, or Firm* — Raguraman Kumaresan

(57) ABSTRACT

A process of issuing a limited-use electronic certificate. In operation, a public key infrastructure (PKI) device receives a request for an electronic certificate from an end entity. The PKI device detects an anomaly with respect to the request received from the end entity. The PKI device generates, based on the detected anomaly, a limited-use electronic certificate. The PKI then issues the limited-use electronic certificate to the end entity. When the end entity determines that the issued certificate is a limited-use certificate with limited-use attributes such as a shortened validity period or lowered assurance level, the end entity provides a visual and/or audio prompt indicating the issuance of the limited-use certificate and further including one or more corrective actions to be performed to eliminate the anomaly prior to sending a new request for an electronic certificate to the PKI device.

21 Claims, 5 Drawing Sheets

(56) References Cited

U.S. PATENT DOCUMENTS

| | | | |
|---|---|---|---|
| 2013/0297933 A1* | 11/2013 | Fiducia | H04L 63/0823 |
| | | | 713/156 |
| 2016/0050199 A1* | 2/2016 | Ganesan | G06F 21/33 |
| | | | 726/7 |
| 2016/0142211 A1* | 5/2016 | Metke | H04L 63/0823 |
| | | | 713/175 |
| 2017/0033935 A1 | 2/2017 | Clark et al. | |
| 2017/0236343 A1 | 8/2017 | Leboeuf et al. | |
| 2020/0314090 A1* | 10/2020 | Dantin, Jr. | H04L 9/50 |
| 2021/0243178 A1 | 8/2021 | Leach | |
| 2022/0311625 A1* | 9/2022 | Pan | H04L 9/321 |

* cited by examiner

DEVICE AND METHOD FOR ISSUING A LIMITED-USE ELECTRONIC CERTIFICATE

BACKGROUND

Public key infrastructure (PKI) is commonly used for enhancing security in a communication network. PKI uses asymmetric cryptography keys, wherein different keys are used for encryption and decryption. In particular, a pair of keys including one public key and one private key is generated for each end entity. For example, when a sender of a message uses the public key of a recipient to encrypt the message, the contents of the message can only be read after being decrypted with the recipient's private key. Conversely, the sender may digitally sign the message with the sender's associated private key, wherein the authenticity of the digitally signed message can be verified using the sender's public key. Hence, when the recipient successfully uses the sender's public key to verify information digitally signed with the sender's private key, the recipient can be certain of the sender and the integrity of the information. To ensure the trustworthiness of public and private keys, trusted third-parties known as certificate authorities issue digital certificates that are digitally signed by the trusted third-parties to guarantee that an entity issued with a digital certificate is, in fact, what the entity claims to be.

In order to obtain a digital certificate, an end entity has to execute a certificate enrollment, renewal, or rekeying process with a PKI. Many organizations rely on a machine-to-machine based certificate enrollment, renewal, or rekeying process in which an end entity requests and receives an initial, renewed, or rekeyed certificate from the PKI without any human intervention. However, in a machine-to-machine based certificate enrollment, renewal, or rekeying process, when an end entity's certificate request is rejected by the PKI for any reason, the end entity cannot access one or more services which rely on the validity of a digital certificate of the end entity.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
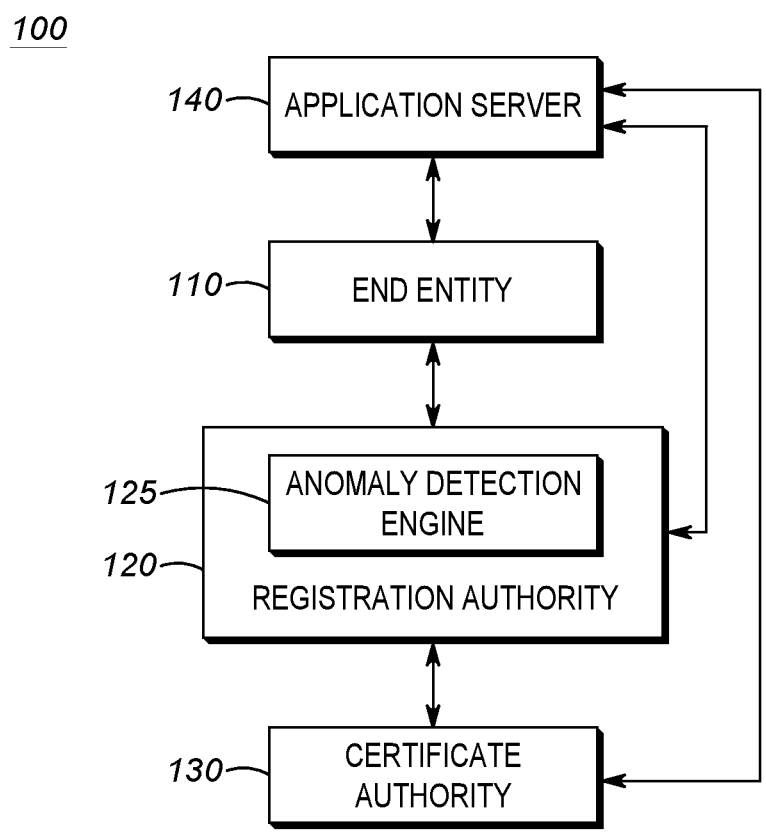
FIG. 1 is a block diagram of a communication system operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, in communications systems implementing a machine-to-machine based certificate enrollment, renewal, or rekeying process, an end entity cannot access one or more associated services whenever a certificate request is rejected by a PKI. As an example, if the end entity has been accessing a service using a valid certificate, then the end entity immediately loses complete access to the service when a certificate request (e.g., a certificate renewal request) is rejected by the PKI. When a certificate request (e.g., enrollment request) is rejected by the PKI, the end entity will be denied access to the requested service without a valid certificate. In some communication systems, the PKI may be configured, by default, to reject a certificate request from an end entity whenever the PKI detects an anomaly with respect to the end entity's certificate request. As an example, an anomaly may be detected with respect to the end entity's certificate request when the certificate request is received outside of a time window allocated (or predominantly used) for the end entity to make certificate requests. As another example, an anomaly may be detected with respect to the end entity's certificate request when the end entity has sent an unusual number of certificate requests during a given time window. While configuring the PKI to automatically reject all anomalous certificate requests enhances overall network security, there are scenarios in which it would be beneficial to provide a limited-use electronic certificate that would allow the end entity to still access the service but in a limited manner. For example, end entities (e.g., radio devices) operated by public-safety agencies may benefit from continued access to at least a limited subset of services (e.g., to make emergency calls). In addition, it would be operationally more efficient to allow end entities to perform corrective actions and eliminate the causes for the detected anomaly even while being able to have continued access to the services in a limited manner with the limited-use certificate. Performing certain corrective actions may allow end entities to increase their trust level and to subsequently obtain full access to services.

Disclosed is an improved device and process for issuing and/or obtaining a limited-use electronic certificate. One embodiment provides a method of issuing a limited-use electronic certificate. The method comprises: receiving, at a public key infrastructure (PKI) device, a request for an electronic certificate from an end entity; detecting, at the PKI device, an anomaly with respect to the request received from the end entity; and generating, at the PKI device, based on the detected anomaly, a limited-use electronic certificate; and issuing, at the PKI device, the limited-use electronic certificate to the end entity.

Another embodiment provides a public key infrastructure (PKI) device. The PKI device includes a communications unit and an electronic processor communicatively coupled to the communications unit. The electronic processor is configured to receive, via the communications interface, a request for an electronic certificate from an end entity; detect an anomaly with respect to the request received from the end entity; and generate based on the detected anomaly, a limited-use electronic certificate; and issue, via the communications interface, the limited-use electronic certificate to the end entity.

A further embodiment provides a method comprising: generating, at an end entity, a request for an electronic certificate; transmitting, at the end entity, the request for the electronic certificate to a public key infrastructure (PKI) device; receiving, at the end entity, a response including an electronic certificate issued by the PKI device; determining, at the end entity, based on one or more attributes included in the electronic certificate, that a limited-use certificate has been issued in response to an anomaly detected by the PKI device with respect to the request; and providing, at the end entity, a visual and/or audio prompt indicating the issuance of the limited-use certificate by the PKI device, the visual and/or audio prompt further including one or more corrective actions to be performed to eliminate the anomaly prior to sending a new request for an electronic certificate to the PKI device.

Each of the above-mentioned embodiments will be discussed in more detail below, starting with example system and device architectures of the system in which the embodiments may be practiced, followed by an illustration of processing blocks for achieving an improved technical method, device, and system for issuing and/or obtaining a limited-use electronic certificate. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including an end entity 110 that is configured to request an electronic certificate from a public key infrastructure (PKI) device. The end entity 110 may be any computing device, for example, a laptop, a smart card, a two way radio, another type of mobile or portable radio, or a smart phone that is configured to request an electronic certificate from the PKI device and to use an electronic certificate issued by the PKI device to access one or more certificate-enabled services (e.g., calls) provided by one or more application servers 140. It should be noted that the PKI device may include one or more of registration authority (RA) devices 120 and certificate authority (CA) devices 130. The CA device 130 is a trusted entity that is responsible for issuing electronic certificates. As used herein, the terms "certificate," "electronic certificate," and "digital certificate" are used interchangeably. An electronic certificate is defined as any data (e.g., a file or other data structure) signed by the CA device 130 using a private key of the CA device 130, which contains a user or end entity's public key and related user/device identity information. The term "signed" or "signature" means performing a cryptographic operation on a block of data, resulting in a new block of data. The RA devices 120 and CA devices 130 are coupled to each other and to the end entity 110 via one or more wired or wireless links. Communication over the wired or wireless links is accomplished via any combination of well-known protocols. Communication over the wired or wireless links is accomplished, for example, via a Simple Certificate Enrollment Protocol (SCEP), a Certificate Management Protocol (CMP), or via Certificate Management Messages over Certificate Management Syntax (CMC). However, the implementation of the present disclosure does not depend on the use of these protocols and standards but can be applied to various other protocols and standards as determined by the particular implementation of the communication system 100 (and corresponding radio access technology). In addition, only one end entity 110, one RA device 120, one CA device 130, and one application server 140 are shown for simplicity of illustration. However, it should be understood that the teachings of the present disclosure extend to a system that includes additional such elements.

In accordance with embodiments, the end entity 110, RA device 120, CA device 130, and application server 140 may communicate with each other over any broadband network such as an IP-based network, where the infrastructure elements within the network (not shown, e.g., IP routers, asynchronous transfer mode (ATM) switches, Multi-Protocol Label Switching (MPLS) switches, home agents, foreign agents, etc.) are IP compliant, for example based on RFC 791 (i.e. IPv4) or RFC 2460, and any subsequent versions. For example, in one illustrative implementation, communication is accomplished via a 3GPP Long Term Evolution (LTE)-compliant network containing an LTE core and Radio Access Network (RAN). In other implementations, communication is accomplished via a Worldwide Interoperability for IEEE 802.16 Microwave Access (WiMAX) core and RAN, a 3GPP2 EV-DO core and RAN, IEEE 802.11 based WiFi, digital subscriber line (DSL), an integrated service digital network (ISDN), a T-1 line, or a satellite connection, among others. Communication can optionally be accomplished via any narrowband network, for example via a gateway, such as a P25 network that includes infrastructure elements, e.g., base stations, base station controllers, and the like that are P25-compliant. Thus, communication can be established using a narrowband protocol such as the Common Air Interface (CAI) protocol or other narrowband protocols of a type well-known in the industry.

In accordance with embodiments, in order to request a certificate, the end entity 110 generates and transmits a certificate request (also referred to as a certificate signing request or CSR) to the RA device 120. The certificate request is one of a request for a new certificate, a request for a rekeyed certificate, or a request for a renewed certificate. The RA device 120 is configured to perform certificate management operations associated with particular certificate enablement service(s) and/or end entities. A certificate management operation may include, for example, certificate issuance (for example, based on a certificate request received from the end entity 110), temporary suspension of certificate, reinstatement or renewal of a suspended certificate, and rekeying, renewing, and/or permanently revoking a certificate. The RA device 120 may determine a certificate-enabled service based, for example, on attributes included in the certificate request. In one embodiment, the attribute may be a dedicated certificate extension in the certificate request. The attribute may be included in the certificate request based on the enrollment method or protocol used to transmit the certificate request. It also may depend on the communication link, for example, a dedicated transmission control protocol (TCP) port. In accordance with embodiments, the RA device 120 includes an anomaly detection engine 125 that is configured to detect any anomaly (e.g., time-based anomaly, location anomaly, unusual number of certificate requests etc.) with respect to the certificate request received from the end entity 110. If the anomaly detection engine 125 detects an anomaly with respect to the certificate request received from the end entity 110, the RA 120, instead of rejecting the certificate request, forwards the certificate request to a CA device 130 with limited-use attributes (e.g., shortened validity period, lower assurance level, or issuance of certificate through a non-standard CA device) to be included in a limited-use certificate to be issued by the CA device 130. The CA device 130 then issues a limited-use certificate with limited-use attributes to the end entity 110. As an example, the limited-use certificate includes a limited-use attribute indicating a shortened validity period associated with the limited-use certificate. The validity period included in the limited-use certificate may be shorter than, for example, a validity period requested by the end entity 110 through the certificate request. In one embodiment, the validity period may be shorter than a standard validity period that the CA device 130 or RA device 120 would have included in a standard-use certificate issued to the end entity 110 if no anomaly were to be detected with respect to the certificate request. As used herein, the term "standard-use certificate" refers to a certificate that is issued by a CA device 130 when no anomaly is detected with respect to a certificate request received from the end entity 110. In case the anomaly detection engine 125 detects no anomaly with respect to the certificate request, the RA device 20 forwards the certificate request with standard-use attributes (e.g., standard validity period, standard assurance level, etc.) to the CA device 130. The CA device 130 in turn issues a standard-use certificate with standard-use attributes to the end entity 110.

The end entity 110 uses the certificate (e.g., limited-use certificate) issued by the CA device 130 to access one or more services offered by the application server 140. The application server 140 may host one or more computer-based services, such as software applications and application programming interfaces (API). For example, the application server 140 may be an email-server that provides an email-application or a call-server that provides a calling application to the end entity 110. In other embodiments, the application server 140 hosts a database accessible through an application programming interface. In other embodiments, the application server 140 hosts a website that provides webpages. For example, in some embodiments, the application server 140 hosts a collection of representational state transfer (REST) based micro-services that are called by the end entity 110. The application server 140 may include a policy enforcement engine that is configured to read the attributes (i.e., limited-use or standard-use attributes) included in the certificate received from the end entity 110 and further make an appropriate access control decision in relation to the computer-based services that can be provided to the end entity 110. As an example, if the certificate issued to an end entity 110 is a limited-use certificate, then the application server 140 may allow the end entity 110 to access the services in a limited manner (e.g., may allow emergency calls, but not other calls) in accordance with the limited-use attributes included in the limited-use certificate.

Figure 2:
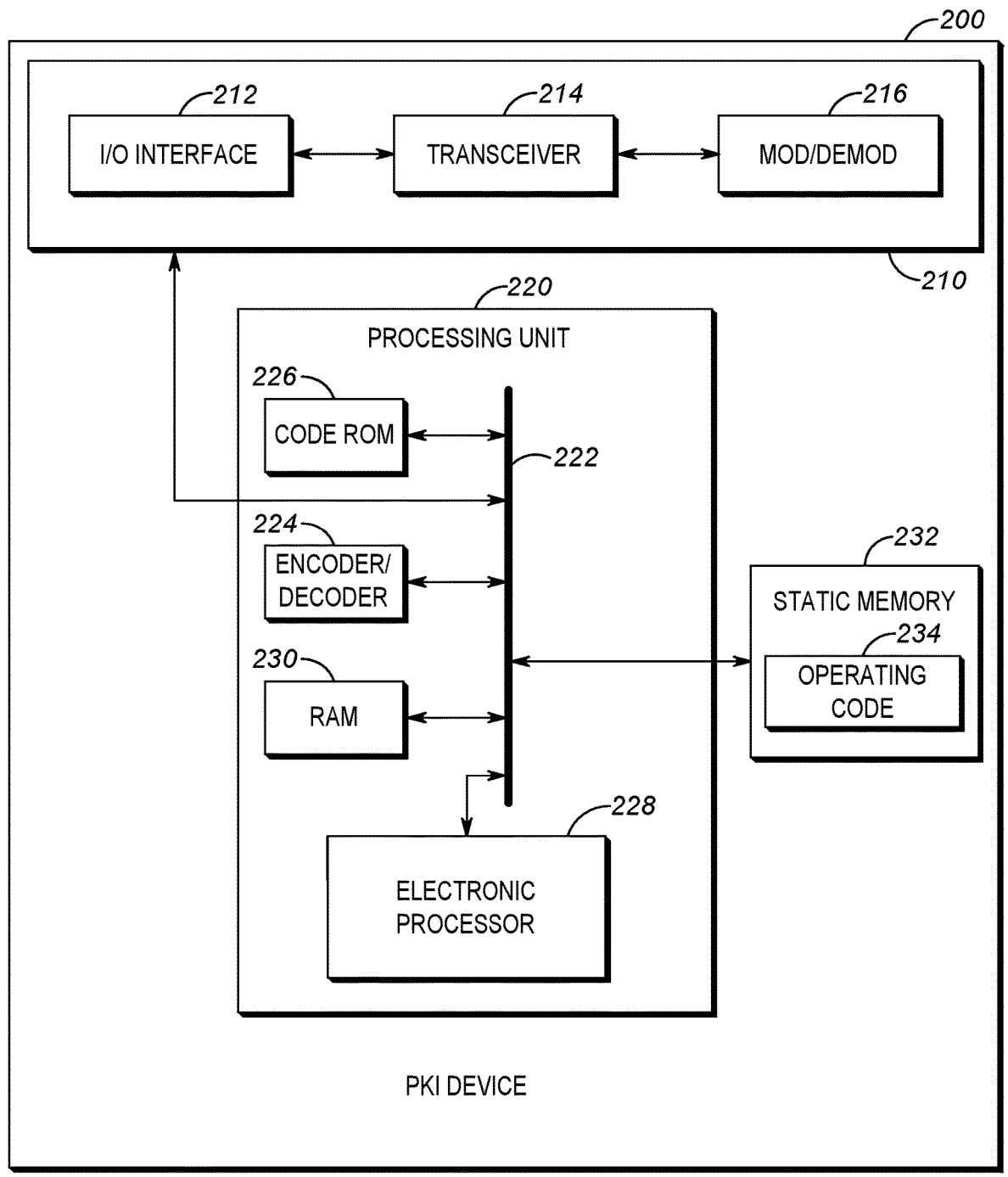
FIG. 2 is a block diagram of a public key infrastructure device used in accordance with some embodiments.

FIG. 2 is a block diagram of a public key infrastructure (PKI) device 200, such as RA device 120 or CA device 130, used in accordance with some embodiments. The PKI device 200 may be embodied in computing devices not illustrated in FIG. 1, and/or may be a distributed computing device across two or more of the foregoing (or multiple of a same type of one of the foregoing) and linked via a wired and/or wireless communication links. The PKI device 200, for example, may include a communications unit 210 coupled to a common data and address bus 222 of a processing unit 220. Depending on the type of device, the PKI device 200 may include fewer or additional components in configurations different from that illustrated in FIG. 2. FOr example, the PKI device 200 may also include an input unit (e.g., keypad, pointing device, etc.) (not shown), an output transducer unit (e.g., speaker) (not shown), an input transducer unit (e.g., a microphone) (MIC) (not shown), and a display screen (not shown), each coupled to be in communication with the processing unit 220.

The communications unit 210 (also referred to as "communication interface") sends and receives data to and from other devices (e.g., end entity 110) in the system 100. The communications unit 210 may include one or more wired and/or wireless input/output (I/O) interfaces 212 that are configurable to communicate with other devices in the system 100. For example, the communications unit 210 may include one or more wireless transceivers 214, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 210 may additionally or alternatively include one or more wireline transceivers 214, such as an Ethernet transceiver, a USB transceiver, or similar transceiver configurable to communicate via a twisted pair wire, a coaxial cable, a fiber-optic link, or a similar physical connection to a wireline network. The transceiver 214 is also coupled to a combined modulator/demodulator 216.

The processing unit 220 may include an encoder/decoder 224 with a code Read Only Memory (ROM) 226 coupled to the common data and address bus 222 for storing data for initializing system components. The processing unit 220 may further include an electronic processor 228 (for example, a microprocessor, a logic circuit, an application-specific integrated circuit, a field-programmable gate array, or another electronic device) coupled, by the common data and address bus 222, to a Random Access Memory (RAM) 230 and a static memory 232. The electronic processor 228 may generate electrical signals and may communicate signals through the communications unit 210, such as for receipt by the end entity 110.

Figure 3:
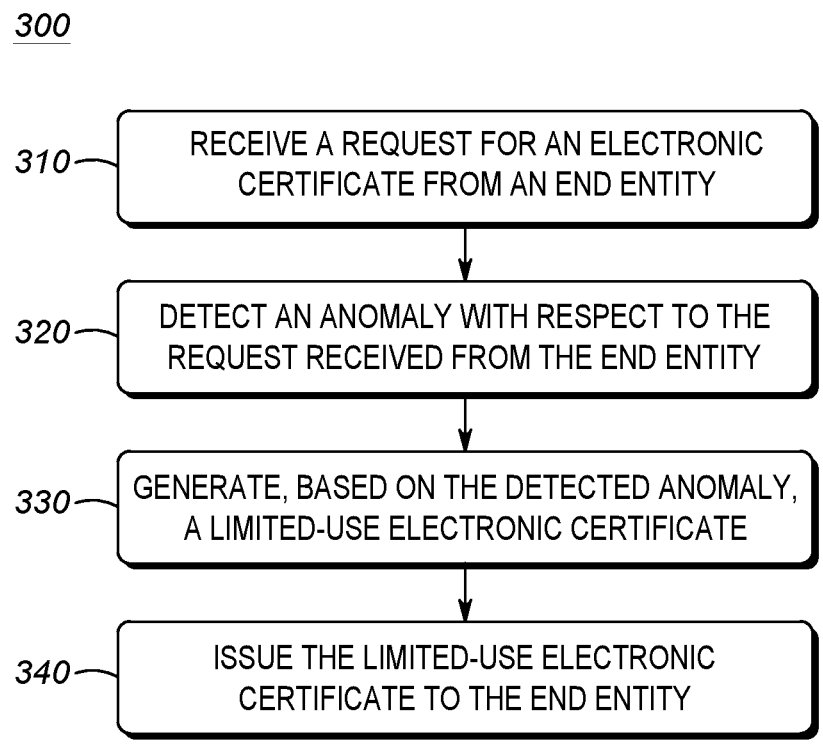
FIG. 3 illustrates a flowchart of a process for issuing a limited-use electronic certificate in accordance with some embodiments.
Figure 5:
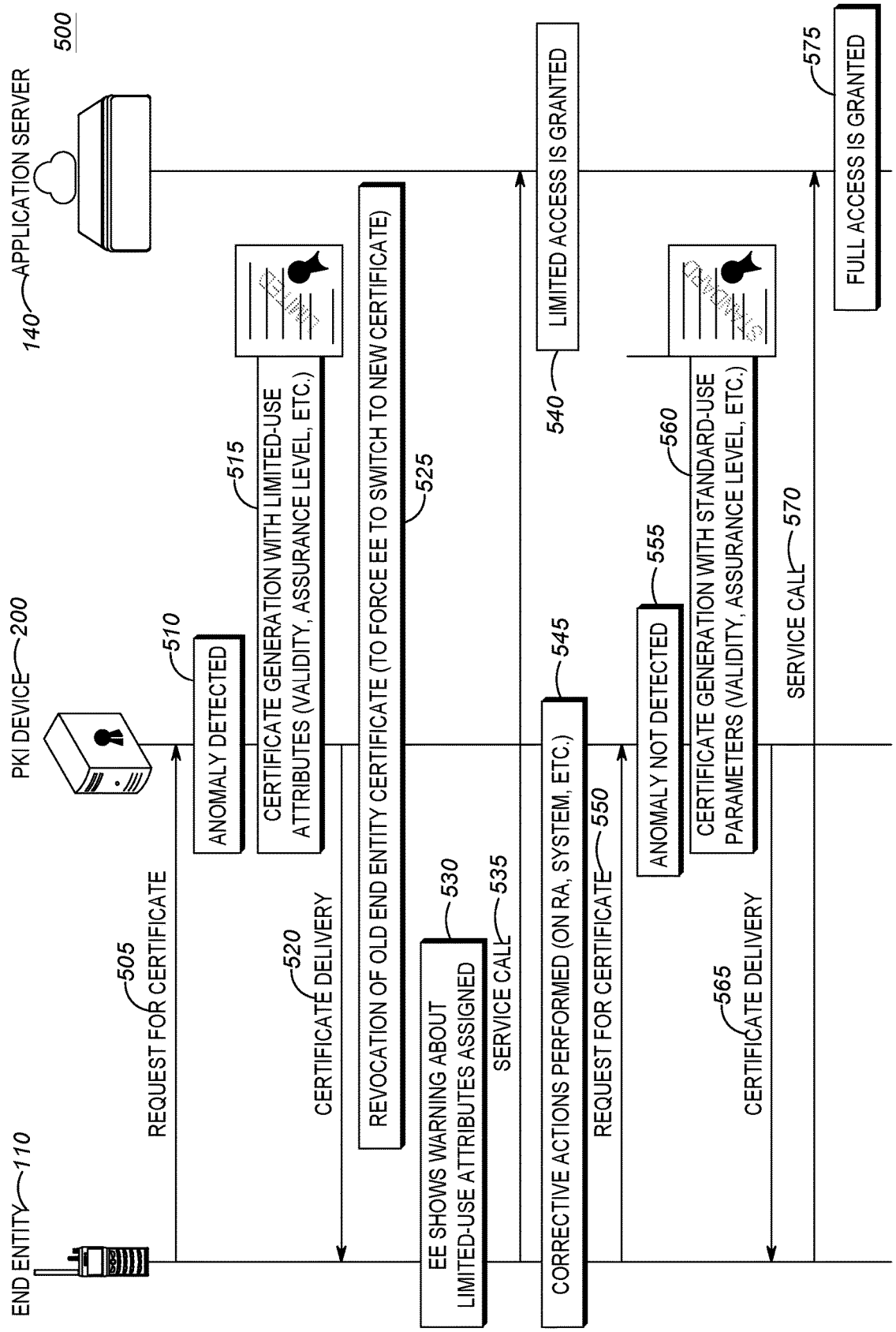
FIG. 5 is a process flow diagram illustrating communications between an end entity, a public key infrastructure device, and an application server.

Static memory 232 may store operating code 234 for the electronic processor 228 that, when executed, performs one or more of the blocks set forth in FIGS. 3 and 5 and the accompanying text(s). The static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In accordance with some embodiments, the end entity 110 may be similarly implemented using one or more of the electronic components shown in FIG. 2. For example, the end entity 110 may include a communications unit including one or more wired or wireless transceivers, a processing unit including an electronic processor and memory including operating code, programs, and instructions that, when executed by the electronic processor, provide for the end entity 110 to perform a set of functions and operations described herein with reference to FIGS. 4 and 5 and the accompanying texts.

Turning now to FIG. 3, a flowchart diagram illustrates a process 300 of issuing a limited-use electronic certificate. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A PKI device 200 (e.g., RA device 120 and/or CA device 130) shown in FIG. 2, and embodied as a singular computing device or distributed computing device may execute process 300 via an electronic processor 228.

The process 300 of FIG. 3 need not be performed in the exact sequence as shown and likewise various blocks may be performed in different order or alternatively in parallel rather than in sequence.

At block 310, the PKI device 200 receives a request for an electronic certificate from an end entity 110. The request for an electronic certificate is one of a request for a new certificate, a request for a rekeyed certificate, or a request for a renewal certificate. In one embodiment, the request for the electronic certificate may include a location of the end entity. The location corresponds to a location of the end entity when the request for the electronic certificate is generated for transmission to the PKI device 200. The location of the end entity may be added in the form of certificate extension in the request. In accordance with some embodiments, the request is signed using a private key of an asymmetric key pair generated for the end entity 110. The RA device 120 may perform certificate request vetting functions on behalf of the issuing CA device 130 by determining whether or not the signed request is to be trusted and to establish a trusted relationship with the end entity 110.

At block 320, the PKI device 200 detects an anomaly with respect to the request received from the end entity 110. In accordance with some embodiments, the RA device 120, via the anomaly detection engine 125 (shown in FIG. 1), detects any anomaly with respect to the request received from the end entity 110. As an example, the anomaly detection engine 125, may detect an anomaly with respect to the request received from the end entity 110 when the request is received outside of a particular time window. The particular time window may refer to a predefined time period (e.g., 9.00 AM-5.00 PM on weekdays) allocated for the end entity 110 to request certificates. In other words, an end entity 110 may be allowed to request certificates only during a particular time period assigned to the end entity 110. Alternatively, the particular time window may refer to a time period during which the end entity 110 predominantly requested certificates in the past. As another example, the anomaly detection engine 125 may detect an anomaly with respect to the number of certificate requests received from the end entity 110 during a given time window. For example, if the number of certificate requests received from the end entity 110 during a given time window (e.g., last 30 minutes) is equal to or more than a threshold number (e.g., 10 requests), the anomaly detection engine 125 may identify the received request as an anomaly. As another example, the anomaly detection engine 125 may detect an anomaly if the number of certificates already issued to the end entity 110 is equal to or more than a threshold number (e.g., 5 certificates). As a further example, the anomaly detection engine 125 may detect an anomaly with respect to the end entity 110 when the end entity 110 was located outside of a particular location. The particular location may refer to a predefined location (e.g., office address, home address, GPS coordinates, etc.) assigned to the end entity 110 to request certificates. In other words, an end entity 110 may be allowed to request certificates only from within the predefined location assigned to the end entity 110. Alternatively, the particular location may refer to a location at which the end entity 110 predominantly requested certificates in the past. In accordance with some embodiments, the anomaly detection engine 125 may supplement one or more of the above factors (e.g., time window, number of requests, number of issued certificates, location etc.) with sensor data (e.g., GPS location data) obtained in relation to the end entity 110 to detect an anomaly with respect to the certificate request received from the end entity 110.

At block 330, the PKI device 200 generates a limited-use certificate based on the anomaly detected at block 320. In accordance with some embodiments, when the anomaly detection engine 125 detects an anomaly with respect to the certificate request received from the end entity 110, the RA device 120 forwards the certificate request and further requests the issuing CA device 130 to issue a limited-use certificate with limited-use attributes. In response, the issuing CA device 130 generates a limited-use certificate including limited-use attributes. As an example, the limited-use certificate includes an attribute indicating a shortened validity period (e.g., a specific expiry date for the certificate) associated with the limited-use certificate. In one embodiment, the validity period included in the limited-use certificate is shorter than a validity period requested by the end entity 110 through the request. In accordance with embodiments, the validity period may be shortened based on a type of service for which certificate is requested. For instance, the end entity 110 may request a valid period for 30 days; however the issuing CA device 130 may provide a shortened validity period of 1 hour to allow the end entity 110 to make an emergency call. In one embodiment, the shortened validity period may be assigned in accordance with a policy programmed at the issuing CA device 130 or RA device 120. As an example, the shortened validity period may be assigned in a manner to allow the end entity 110 to perform one or more corrective actions to eliminate the anomaly prior to sending a new request for an electronic certificate to the PKI device 200. In another embodiment, the validity period included in the limited-use certificate is shorter than a validity period which the PKI would have otherwise included (e.g., a predefined validity period of 30 days) in the certificate in case of determining that no anomaly exists with respect to the certificate request. As another example, the limited-use certificate may additionally or alternatively include an attribute indicating a lower assurance level associated with the limited-use electronic certificate. The assurance level of an issued certificate may be used by a relying party (e.g., application server 140) to determine the trust level of an end entity 110 and to further determine a level of service that could be provided to the end entity 110. In one embodiment, the assurance level included in the limited-use electronic certificate is lower than an assurance level requested by the end entity 110 through the request. For instance, the end entity 110 may request a high assurance level certificate (e.g., level 3 assurance certificate), however the issuing CA device 130 may provide a lower assurance level certificate (e.g., level 1 assurance certificate) that may allow the end entity 110 to access only a limited set of services (e.g., make a call to an emergency number, but not other contact numbers), from the application server 140. In one embodiment, the issuing CA device 130 may include a special attribute expressly indicating that the issued certificate is a limited-use certificate. For example, if the issued certificate is a limited-use certificate, the special attribute may be represented by a binary value '1'. On the other hand, if the issued certificate is a standard-use certificate (i.e., when no anomaly is detected with respect to the received certificate request), the special attribute may be represented by a binary value '0'. In one embodiment, the issuing CA device 130 does not include any special attribute when the issued certificate is a standard-use certificate.

In one embodiment, when the anomaly detection engine 125 detects an anomaly with respect to the certificate request received from the end entity 110, the RA device 120 forwards the certificate request to a non-standard CA device. As used herein, the term "non-standard CA device" refers to a certificate issuing authority with lower assurance level than a standard certificate issuing authority (e.g., CA device 130) which would be normally (i.e., in case of no anomaly detection) used to issue certificates to the end entity 110. In one embodiment, the non-standard CA device may be housed in the same infrastructure as the standard CA device 130. In other words, in this embodiment, the non-standard CA device and standard CA device are logical entities with different assurance levels, but housed in the same infrastructure. The limited-use certificate includes an attribute indicating that the certificate is signed by a certificate authority that is different from one of: a certificate authority requested by the end entity through the request, or a certificate authority that the PKI device 200 would have other used otherwise for signing the certificate in case of determining that no anomaly exists with respect to the certificate request.

At block 340, the PKI device 200 issues the limited-use certificate to the end entity 110. In accordance with embodiments, the CA device 130 issues the limited-use certificate to the end entity 110. The CA device 130 may transmit a response including the limited-use certificate to the end entity 110 via a wired or wireless communication link.

In accordance with some embodiments, when an anomaly is detected with respect to the certificate request received from the end entity 110, the PKI device 200 revokes all of or one or more of electronic certificates previously issued to the end entity 110. The PKI device 200 may further transmit a notification to the end entity 110, where the notification indicates the revocation of all of or one or more of the electronic certificates previously issued to the end entity 110. In one embodiment, the notification is included with the limited-use certificate in the response transmitted from the CA device 130 to the end entity 110. In another embodiment, the notification may be transmitted as a separate message from the CA device 130 to the end entity 110.

Figure 4:
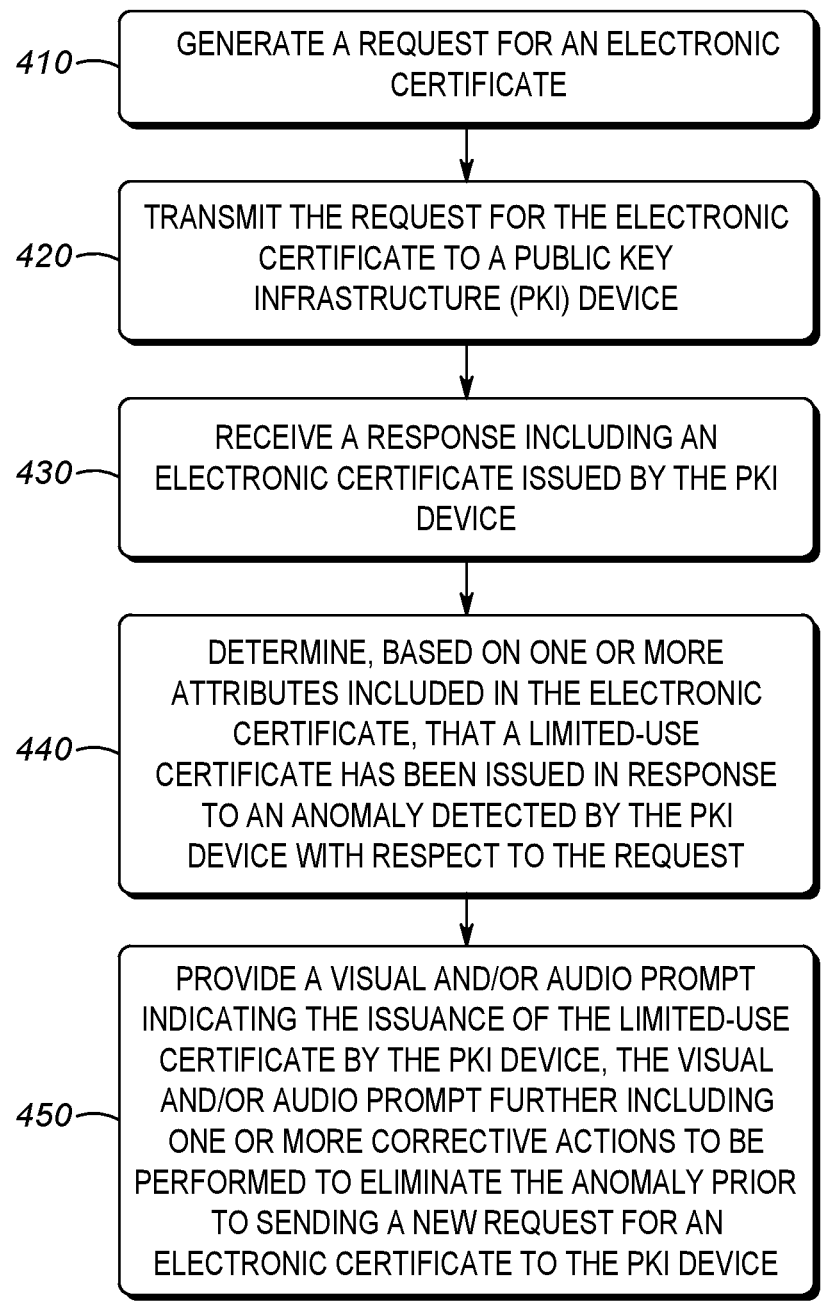
FIG. 4 illustrates a flowchart of a process for obtaining a limited-use electronic certificate in accordance with some embodiments.

Turning now to FIG. 4, a flowchart diagram illustrates a process 400 of issuing a limited-use electronic certificate. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. An end entity 110 shown in FIG. 1, and embodied as a singular computing device or distributed computing device may execute process 400 via an electronic processor.

The process 400 of FIG. 4 need not be performed in the exact sequence as shown and likewise various blocks may be performed in different order or alternatively in parallel rather than in sequence.

At block 410, the end entity 110 generates a request for an electronic certificate from an end entity 110. The request for an electronic certificate is one of a request for a new certificate, a request for a rekeyed certificate, or a request for a renewal certificate. In accordance with some embodiments, the request is signed using a private key of an asymmetric key pair generated for the end entity 110.

At block 420, the end entity 110 transmits the request for the electronic certificate to a public key infrastructure (PKI) device 200, for example, a RA device 120.

At block 430, the end entity 110 receives a response including an electronic certificate issued by the PKI device 200.

At block 440, the end entity 110 processes the received electronic certificate and further determines, based on one or more attributes included in the electronic certificate, that a limited-use certificate has been issued in response to an anomaly detected by the PKI device 200 with respect to the certificate request. The end entity 110 reads the attributes included in the received electronic certificate to determine whether a standard-use certificate or a limited-use certificate has been issued. As an example, if an attribute included in the electronic certificate indicates a validity period that is lower than a validity period requested by the end entity 110, then the end entity 110 may determine that the issued certificate is a limited-use certificate. As another example, if an attribute included in the electronic certificate indicates an assurance level that is lower than an assurance level requested by the end entity 110, then the end entity 110 may determine that the issued certificate is a limited-use certificate. As a further example, if an attribute included in the electronic certificate indicates that the certificate is issued by a certificate authority that is different from a certificate authority requested by the end entity 110, then the end entity 110 may determine that the issued certificate is a limited-use certificate. In one embodiment, where the issuing CA device 130 includes a special attribute expressly indicating that the issued certificate is a limited-use certificate, the end entity 110 may be programmed to first parse the special attribute included in the electronic certificate and further determine whether the issued certificate is a limited-use certificate or not. For example, if the special attribute is represented by a binary value '1', then the end entity 110 determines that the issued certificate is a limited-use certificate. On the other hand, if no special attribute is included or if the special attribute is included, but represented by a binary value '0', then the end entity 110 determines that the issued certificate is a standard-use certificate. In one embodiment, a dedicated private extension can be included in the certificate to indicate to the end entity 110 that the issued certificate is a limited-use certificate and/or to indicate to the end entity 110 that additional corrective actions are needed to obtain a standard-use certificate with standard-use attributes that include, for example, a validity period or assurance level desired by the end entity 110.

At block 450, the end entity 110 provides a visual and/or audio prompt indicating the issuance of the limited-use certificate by the PKI device 200. The visual and/or audio prompt may include one or more corrective actions that are recommended to be performed to eliminate the anomaly prior to sending a new request for an electronic certificate to the PKI device 200. As an example, the end entity 110 may prompt the user of the end entity 110 to move to an assigned location (i.e., a location assigned to the end entity 110 for requesting certificates) or a location at which the end entity 110 predominantly requested certificates in the past. As another example, the end entity 110 may prompt the user to wait until the beginning of a next time window (e.g., a time period allocated for the end entity 110 to request certificates or a time period during which the end entity 110 predominantly requested certificates in the past) to make a new request for certificate. As a further example, the end entity 110 may prompt the user to send the new request for certificate after the expiry of a current time window (i.e., waiting for some time period before sending a new request) or after the expiry of a predefined number of certificates currently issued to the end user entity (i.e., waiting until the expiry of existing issued certificates in order to reduce the total number of issued certificates to be lower than a threshold number). In one embodiment, the end entity 110 may automatically perform one or more corrective actions without any input or action from the user. As an example, the end entity 110 may perform a corrective action by waiting until the beginning of a particular time window (e.g., a particular time of day during which the end entity 110 predominantly requested certificates in the past) to send a new request for a certificate to the PKI device 200. In accordance with some embodiments, a number of attempts to perform corrective actions by an end entity 110 may be limited for security reasons. In the above examples, the PKI device 200 will issue a standard-use certificate to the end entity 110 when the PKI device 200 does not detect any anomaly with respect to the new request. As a further example, the end entity 110 may prompt the user to send a message requesting a supervisor (e.g., user's manager) to override the PKI's decision to issue a limited-user certificate to the end entity 110. When the supervisor verifies the user and approves the user's request to override the PKI's decision, the PKI device 200 will issue a standard-use certificate to the end entity 110 in response to a new request for certificate. In this case, the PKI device 200 will issue a standard-use certificate even if an anomaly is detected with respect to the new request. In one embodiment, the end entity 110 may perform a corrective action by including additional user credentials (e.g., user credentials not included in a previous request for certificate), for example, user biometric data, while sending a new request for certificate to the PKI device.

In any case, whether or not the end entity 110 has performed corrective actions to eliminate the cause for the anomaly, the end entity 110 can immediately use the limited-use electronic certificate to access one or more services provided by the application server 140 in a limited manner. In one embodiment, the end entity 110 transmits a request including the limited-use certificate to access a service provided by the application server 140. In response, the application server 140 reads the attributes included in the certificate received from the end entity 110 and further makes an appropriate access control decision in relation to one or more services to be provided to the end entity 110. As an example, if the certificate issued to an end entity 110 is a limited-use certificate, then the application server 140 may allow the end entity 110 to access the services in a limited manner (e.g., by allowing emergency calls, but not other calls, by limiting access control permissions, by prohibiting access to confidential or restricted data etc.) in accordance with the limited-use attributes included in the limited-use certificate.

FIG. 5 is a process flow diagram 500 illustrating communications between an end entity 110, a PKI device 200, and an application server 140. The end entity 110 sends 505 a request for certificate to the PKI device 200. The PKI device 200 detects 510 an anomaly with respect to the certificate request received from the end entity 110 and in response generates 515 a limited-use certificate with limited-use attributes (e.g., validity period, assurance level etc.). The PKI device 200 then delivers 520 the limited-use certificate to the end entity 110. In accordance with some embodiments, the PKI device 200 also revokes 525 certificates previously issued to the end entity 110 in order to force the end entity 110 to switch to the new limited-use certificate. In other words, revocation of previous certificates issued to the end entity 110 will ensure that the end entity 110 cannot use the previous certificates to obtain full-access to services provided by the application server 140. In addition to or alternative to standard methods like publishing certificate revocation list (CRL) and responding to OCSP (Online Certificate Status Protocol), the PKI device 200 may send a signal to the application server 140 to notify the revocation of certificates issued to the end entity 110. The end entity (EE) 110 may process the limited-use certificate and in response may provide 530 a prompt warning a user associated with the end entity 110 about the issuance of a limited-use certificate. The end entity 110 then makes a service call 535 including the limited-use certificate to the application server 140. The application server 140 grants 540 limited access to the requested service on the basis of the limited-use certificate. The end entity 110 and/or the PKI device 200 perform 545 corrective actions to eliminate the cause for the anomaly detected with respect to the previous certificate request.

After performing corrective actions to eliminate the anomaly, the end entity 110 sends 550 a new request for certificate to the PKI device 200. In this example, since the PKI device 200 does not detect 555 any anomaly with respect to the new request, the PKI device 200 generates 560 a standard-use certificate with standard-use parameters (e.g., standard validity, standard assurance level, etc.). The PKI device 200 then delivers 565 the standard-use certificate to the end entity 110. The end entity 110 then makes a service call 570 including the standard-use certificate to the application server 140. The application server 140 grants 575 full access to the requested service on the basis of the standard-use certificate.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of issuing a limited-use electronic certificate, the method comprising:
receiving, at a public key infrastructure (PKI) device, a request for an electronic certificate from an end entity;
detecting, at the PKI device, an anomaly with respect to the request received from the end entity;
generating, at the PKI device, based on the detected anomaly, a limited-use electronic certificate; and
issuing, at the PKI device, the limited-use electronic certificate to the end entity,
wherein the limited-use electronic certificate includes an attribute indicating that the certificate is signed by a certificate authority that is different from one of: a certificate authority requested by the end entity through the request; or a certificate authority that the PKI device would have used for signing the certificate in case of determining that no anomaly exists with respect to the certificate request.

2. The method of claim 1, wherein the limited-use electronic certificate includes another attribute indicating a shortened validity period associated with the limited-use certificate.

3. The method of claim 2, wherein the validity period is shorter than one of: a validity period requested by the end entity through the request; or a validity period that the PKI device would have included in the certificate in case of determining that no anomaly exists with respect to the certificate request.

4. The method of claim 1, wherein the limited-use electronic certificate includes another attribute indicating a lower assurance level associated with the limited-use electronic certificate.

5. The method of claim 4, wherein the assurance level is lower than one of: an assurance level requested by the end entity through the request, or an assurance level that the PKI device would have included in an issued electronic certificate in case of determining that no anomaly exists with respect to the request.

6. The method of claim 1, wherein the request is one of a request for a new certificate, a request for a rekeyed certificate, or a request for a renewed certificate.

7. The method of claim 1, wherein detecting the anomaly comprises:
determining that the request is received from the end entity while the end entity was located outside of a particular location.

8. The method of claim 1, further comprising:
revoking one or more electronic certificates previously issued to the end entity when the anomaly is detected with respect to the request received from the end entity; and
transmitting a notification to the end entity, the notification indicating the revocation of one or more electronic certificates previously issued to the end entity.

9. The method of claim 1, wherein detecting the anomaly comprises:
determining that the request is received outside of a particular time window.

10. The method of claim 1, wherein detecting the anomaly comprises:
determining that a threshold number of requests for certificates are received from the end entity during a given time window.

11. The method of claim 1, wherein detecting the anomaly comprises:
determining that the end entity has already been issued a threshold number of certificates.

12. A public key infrastructure (PKI) device, comprising:
a communications interface; and
an electronic processor communicatively coupled to the communications interface, the electronic processor configured to:
receive, via the communications interface, a request for an electronic certificate from an end entity;
detect an anomaly with respect to the request received from the end entity;
generate based on the detected anomaly, a limited-use electronic certificate; and
issue, via the communications interface, the limited-use electronic certificate to the end entity,
wherein the limited-use electronic certificate includes an attribute indicating that the certificate is signed by a certificate authority that is different from one of: a certificate authority requested by the end entity through the request; or a certificate authority that the PKI device would have used for signing the certificate in case of determining that no anomaly exists with respect to the certificate request.

13. The PKI device of claim 12, wherein the limited-use electronic certificate includes another attribute indicating a shortened validity period associated with the limited-use certificate.

14. The PKI device of claim 12, wherein the limited-use electronic certificate includes another attribute indicating a lower assurance level associated with the limited-use electronic certificate.

15. The PKI device of claim 12, wherein the electronic processor is configured to detect an anomaly with respect to the request received from the end entity when the request is received outside of a particular time window, when a threshold number of requests for certificates are received from the end entity during a given time window, when the end entity has already been issued a threshold number of certificates, or when the request is received from the end entity while the end entity was located outside of a particular location.

16. The PKI device of claim 12, wherein the electronic processor is configured to:
revoke one or more electronic certificates previously issued to the end entity when the anomaly is detected with respect to the request received from the end entity; and transmit, via the communications interface, a notification to the end entity, the notification indicating the revocation of one or more electronic certificates previously issued to the end entity.

17. A method comprising:

generating, at an end entity, a request for an electronic certificate;

transmitting, at the end entity, the request for the electronic certificate to a public key infrastructure (PKI) device;

receiving, at the end entity, a response including an electronic certificate issued by the PKI device;

determining, at the end entity, based on one or more attributes included in the electronic certificate, that a limited-use certificate has been issued in response to an anomaly detected by the PKI device with respect to the request, wherein the one or more attributes indicate that the electronic certificate is signed by a certificate authority that is different from one of: a certificate authority requested by the end entity through the request; or a certificate authority that the PKI device would have used for signing the certificate in case of determining that no anomaly exists with respect to the certificate request; and providing, at the end entity, a visual and/or audio prompt indicating the issuance of the limited-use certificate by the PKI device, the visual and/or audio prompt further including one or more corrective actions to be performed to eliminate the anomaly prior to sending a new request for an electronic certificate to the PKI device.

18. The method of claim 17, wherein the limited-use certificate includes one or more of:

a first attribute indicating a shortened validity period associated with the limited-use certificate; and a second attribute indicating a lower assurance level associated with the limited-use certificate.

19. The method of claim 17, further comprising:

transmitting a request to access a service provided by an application server, the request including the limited-use certificate; and receiving a limited access to the service provided by the application server.

20. The method of claim 17, wherein the response further indicates revocation of electronic certificates previously issued to the end entity.

21. The method of claim 17, wherein corrective actions include one or more of:

sending the new request during a time window allocated for the end entity to request certificates;

sending the new request after the expiry of a current time window;

sending the new request after the expiry of a predefined number of certificates currently issued to the end entity;

sending the new request for a certificate from a location predefined for the end entity to request certificates; and sending the new request by including additional user credentials in the request for the electronic certificate.

* * * * *